(12) United States Patent
Ushio

(10) Patent No.: US 8,249,432 B2
(45) Date of Patent: Aug. 21, 2012

(54) VIDEO AND AUDIO PLAYBACK APPARATUS AND VIDEO AND AUDIO PLAYBACK METHOD

(75) Inventor: Yasuyuki Ushio, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 12/687,477

(22) Filed: Jan. 14, 2010

(65) Prior Publication Data
US 2010/0178039 A1 Jul. 15, 2010

(30) Foreign Application Priority Data

Jan. 14, 2009 (JP) ................. P2009-005527

(51) Int. Cl.
*H04N 5/928* (2006.01)
(52) U.S. Cl. ........................................ 386/338; 386/345
(58) Field of Classification Search .................. None
See application file for complete search history.

(56) References Cited

U.S. PATENT DOCUMENTS

| 6,363,208 B2 * | 3/2002 | Nitta et al. ................ 386/344 |
| 6,636,563 B2 * | 10/2003 | Tsukagoshi ............ 375/240.12 |
| 7,720,350 B2 * | 5/2010 | Surline .................... 386/343 |

FOREIGN PATENT DOCUMENTS

| JP | 2006-191248 | 7/2006 |
| JP | 2006-345568 | 12/2006 |
| JP | 2007-251867 | 9/2007 |

OTHER PUBLICATIONS

Office Action dated Nov. 2, 2010, in Patent Application No. 2009-005527 (with English Translation).

* cited by examiner

*Primary Examiner* — Huy T Nguyen
(74) *Attorney, Agent, or Firm* — Oblon, Spivak, McClelland, Maier & Neustadt, L.L.P.

(57) ABSTRACT

A video and audio playback apparatus which generate a video and an audio at high-speed in accordance with the respective characteristics is provided. The apparatus plays back a video/audio data having a first video data encoded by an intra-frame encoding, a second video data encoded by an inter-frame prediction encoding and an audio data corresponding to the video frame of the first video data or the second video frame. The apparatus includes a deciding unit to determine a first rate, a second rate and a number of times; a first extraction unit to extract the first video data from the video/audio data at the first rate; a second extraction unit to extract the audio data from the video/audio data at the second rate; a playback unit to play back the first video data the number of times; and an audio playback unit to play back the audio data.

4 Claims, 3 Drawing Sheets

| PLAYBACK SPEED (nX SPEED) | VIDEO FRAME DATA | | AUDIO FRAME DATA | | |
|---|---|---|---|---|---|
| | EXTRACTION RATE (1/(n x m)) | NUMBER OF TIMES OF PLAYBACK (m) | EXTRACTION RATE (1/(n x m)) | | NUMBER OF TIMES OF PLAYBACK (m) |
| | | | EXTRACTION CONDTION 1 | EXTRACTION CONDTION 2 | |
| 3X | 1/15 | 5 | 1/3 | 7/21 | 1 |
| 5X | 1/15 | 3 | 1/5 | 4/20 | |
| 15X | 1/15 | 1 | 1/15 | 1/15 | |

VIDEO AND AUDIO PLAYBACK APPARATUS AND VIDEO AND AUDIO PLAYBACK METHOD

CROSS REFERENCE TO RELATED APPLICATION

This application is based upon and claims the benefit of priority from Japanese Patent Application No. 2009-5527, filed on Jan. 14, 2009, the entire contents of which are incorporated herein by reference.

FIELD OF THE INVENTION

The invention relates to a video and audio playback apparatus and a video and audio playback method.

DESCRIPTION OF THE BACKGROUND

In a video and audio recording apparatus, video and audio are digitized, encoded according to a standard such as MPEG, and recorded on a recording medium as digital data. The video and audio playback apparatus decodes the digital data recorded on the recording medium and the plays back the video and the audio.

An art which plays back video and audio at a speed higher than a usual speed is known in JP,P2004-140723A, for example. Skip playback giving continuity in some degree becomes possible by playing back predetermined number of frames normally in series after playing back a picture of one frame for every several frames. However, an art which plays back the video and the audio in accordance with their characteristics is not shown in JP,2004-140723A.

SUMMARY OF THE INVENTION

An object of the invention is to provide an video and audio playback apparatus and an video and audio playback method which plays back video and audio in accordance with their respective characteristics at high-speed playback.

A video and audio playback apparatus according to the one embodiment of the invention is a video and audio playback apparatus for playing back a video and audio data having a first video data encoded by an intra-frame encoding, a second video data encoded by an inter-frame prediction encoding and an audio data corresponding to a video frame of the first video data or the second video data. The apparatus includes: an input unit configured to receive a playback speed; a deciding unit to determine a first rate at which the first video data is extracted from the video and audio data, a second rate at which the audio data is extracted from the video and audio data, and a number of times which the first video data extracted is played back, in accordance with the playback speed received by the input unit; a first extraction unit configured to extract the first video data from the video and audio data at the first rate decided by the deciding unit; a second extraction unit configured to extract the audio data from the video and audio data at the second rate decided by the deciding unit; a video playback unit configured to playback the first video data extracted by the first extraction unit the number of times determined by the deciding unit; and an audio playback unit configured to playback the audio data extracted by the second extraction unit.

A video and audio data playback method according to the one embodiment of the invention is a video and audio data playback method for playing a first video data encoded by an intra-frame encoding, a second video data encoded by an inter-frame prediction encoding and an audio data corresponding to a video frame of the first video data or the second video frame. The method includes: a receiving step to receive a playback speed, a deciding step to decide a first rate at which the first video data is extracted from the video and audio data, a second rate at which the audio data is extracted from the video and audio data, and a number of times which the first video data extracted is played back, in accordance with the playback speed received by the receiving step; a first extracting step to extract the first video data from the video and audio data at the first rate decided by the deciding step; a second extracting step to extract the audio data from the video and audio data at the second rate decided by the deciding step; a first playing back step to play back the first video data extracted by the first extracting step the number of times determined by the deciding step; and a second playing back step to play back the audio data extracted by the second extracting step.

A video and audio playback apparatus according to the one embodiment of the invention includes: a recording medium configured to record a video data having a plurality of video frames including a first video data encoded by an intra-frame encoding and a second video data encoded by an inter-frame prediction encoding, and an audio data having an audio frame data corresponding to the video frames; a storage unit configured to record a video frame extraction rate at which the first video frame data is extracted from the video data, an audio frame extraction rate at which the audio frame data is extracted from the audio data, and a number of times of a video playback which the first video frame data extracted is played back, according to a playback speed; an input unit configured to receive the playback speed; a deciding unit configured to read the video frame extraction rate, the audio frame extraction rate, and the number of times of the video playback, in accordance with the playback speed received by the input unit with reference to the storage medium, and to decide a first rate at which the first video frame data is extracted from the video, a second rate at which the audio frame data is extracted from the audio data, and the number of times which the first video data extracted is played back; a medium control unit configured to read the video data and the audio data from the recording medium in accordance with the playback speed received by the input unit; a first extraction unit configured to extract the first video frame data at the first rate from the video data; a second extraction unit configured to extract the audio frame data at the second rate from the audio data; a video playback unit configured to play back the number of times the first video frame data extracted by the first extraction units; and an audio playback unit configured to play back the audio frame data extracted by the second extraction unit.

DETAILED DESCRIPTION OF THE INVENTION

Figure 1:
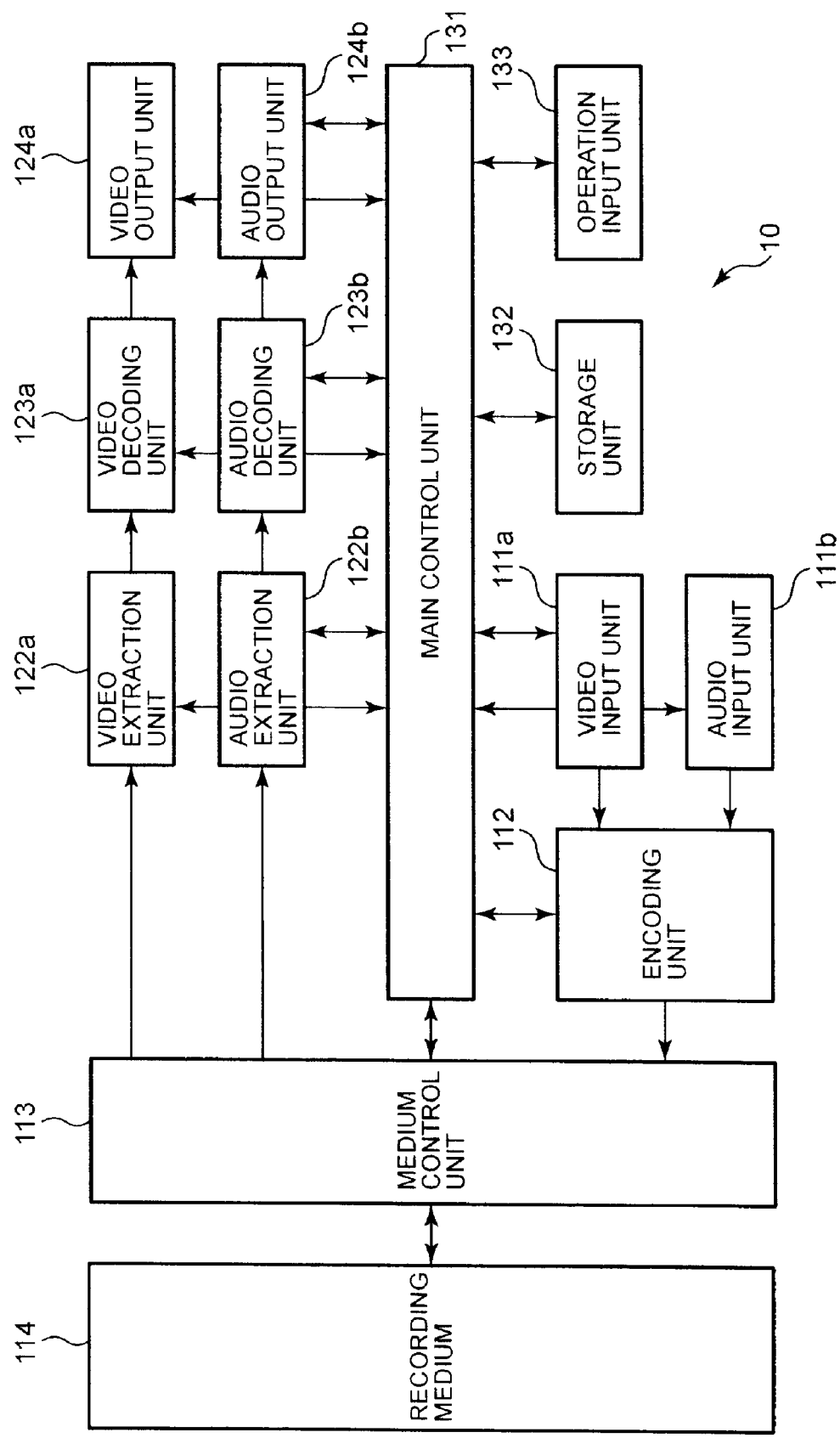
FIG. 1 is a block diagram showing a video and audio recording and playback apparatus 10 according to a first embodiment of the present invention.

Hereinafter, embodiments of the invention will be explained in detail with reference to the drawings. FIG. 1 is a block diagram showing a video and audio recording and playback apparatus 10 of one embodiment of the present invention. The video and audio recording and playback apparatus 10 is capable of recording and playing back of video and audio, and is capable of adjusting a playback speed of the video and the audio suitably.

The video and audio recording and playback apparatus 10 includes a video input unit 111*a*, an audio input unit 111*b*, an encoding unit 112, a medium control unit 113, a recording medium 114, an video extraction unit 122*a*, an audio extraction unit 122*b*, a video decoding unit 123*a*, an audio decoding unit 123*b*, a video output unit 124*a*, an audio output unit 124*b*, a main control unit 131, a storage unit 132, and an operation input unit 133.

The video input unit 111*a* is a device which converts an image into an electrical signal, and the video input unit 111*a* is a television camera, for example. The video input unit 111*a* outputs a video signal to the encoding unit 112.

The audio input unit 111*b* is a device which converts sound into an electrical signal, and the audio input unit 111*b* is a microphone, for example. The audio input unit 111*b* outputs an audio signal to the encoding unit 112.

The encoding unit 112 encodes the video signal which is outputted from the video input unit 111*a* using a MPEG-2 standard, for example, and generates an ES (.elementary stream).

The video signal includes GOPs and one GOP has a plurality of frames (pictures). The GOP may include I picture (Intra Picture), P picture (Predictive Picture) and B picture (Bidirectionally Predictive Picture). "IBBPBBPBBPBBPBB" can form one GOP when the GOP comprises 15 frames, for example. In addition, here, "IBB", "PBB", etc. mean sequential combinations of "I picture, B picture and B picture", "P picture, B picture and B picture", etc.

As for I picture, a picture is encoded by a compression encoding in the frame (picture). This compression encoding can use DCT (discrete cosine transformation) which uses 8×8 pixels as one unit. I picture corresponds to a first video data encoded by an intra-frame encoding.

As for P picture, a picture is encoded by a prediction encoding in an inter-frame (time-axis) forward direction other than the compression encoding in the frame. As for B picture, a picture is encoded by the prediction coding in the inter-frame (time-axis) forward direction and an opposite direction (both directions) other than the compression encoding in the frame. P picture and B picture correspond to a second video data encoded by the intra-frame prediction encoding.

The medium control unit 113 controls record of the video data and the audio data on the recording medium 114 and read-out of the video data and the audio data from the recording medium 114. The medium control unit 113 writes the video data and the audio data outputted from the encoding unit 112 on the recording medium 114. Further, the medium control unit 113 reads the video data and the audio data from the recording medium 114 at a speed corresponding to the playback speed.

The recording medium 114 is a medium on which the information is recorded and from which the information is read-out. The recording medium 114 is a magnetic tape, an optical disc (DVD (Digital Versatile Disk) etc.) and a memory card (SD card etc.), for example.

The video extraction unit 122*a* extracts a video frame data from the video signal corresponding to the playback speed. The video extraction unit 122*a* corresponds to a first extraction unit that extracts the first video frame data from the video signal at a first rate.

The audio extraction unit 122*b* extracts an audio frame data from the audio signal corresponding to the playback speed. The audio extraction unit 122*b* corresponds to the second extraction unit that extracts the audio frame data from the audio signal at the second rate.

The video decoding unit 123*a* decodes the video frame data extracted by the video extraction unit 122*a*, and outputs the decoded video data as a video signal. The video decoding unit 123*a* functions as an video playback unit that plays back the extracted first video frame data the number of times which is determined by the main control unit 131.

The audio decoding unit 123*b* decodes the audio frame data extracted by the audio extraction unit 122*b* and outputs the decoded audio data as an audio signal. The audio decoding unit 123*b* functions as an audio playback unit that plays back the extracted audio data.

The video output unit 124*a* is a display device which displays a video based on the video signal decoded by the video decoding unit 123*a*. The video output unit 124*a* is a liquid crystal display, a plasma display, a cathode ray tube, for example.

The audio output unit 124*b* is a device which outputs sound based on the audio signal decoded by the audio decoding unit 123*b*. The audio output unit 124*b* is a loudspeaker, a headphone, for example.

The operation input unit 133 is an input device with which a user can input the information (for example, the playback speed). The operation input unit 133 is a keyboard, for example.

The main control unit 131 is a control device which controls the video and audio recording and playback apparatus 10 whole. The main control unit 131 functions as a deciding unit which determines the first rate at which the first video frame data is extracted from the video signal, the second rate at which the audio frame data is extracted from the audio signal, and the number of times which the extracted first video frame data is played back, corresponding to the playback speed. In addition, the main control unit 131 can use a below-mentioned extraction and playback condition table T for this determination.

Figures 2, 3:
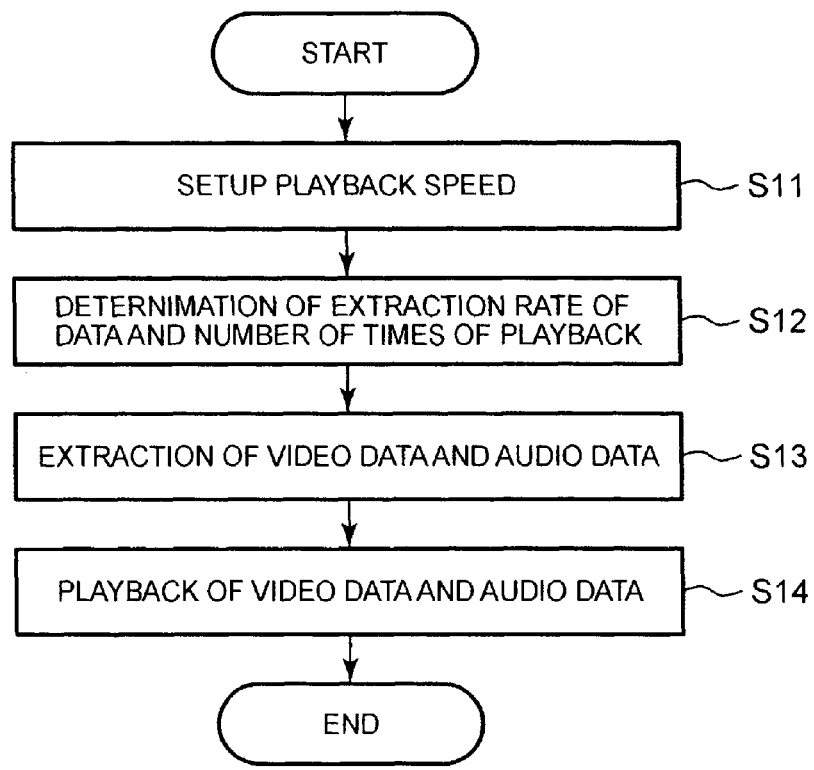
FIG. 2 is a schematic diagram showing an example of extraction and playback condition table T.
FIG. 3 is a flow chart showing an example of operating procedure of the video and audio recording and playback apparatus 10.

The storage unit 132 is a memory or a hard disk drive which memorizes data, and the storage unit 132 memorizes the extraction and playback condition table T. FIG. 2 is a schematic diagram showing an example of the extraction and playback condition table T. The extraction and playback condition table T shows a relation of the playback speed, the extraction rate of the video frame data, the number of times of the playback of the video frame data, the extraction rate of the audio frame data and the number of times of the playback of the audio frame data.

Next, the playback of the video and the audio is explained.

(1) Extraction and Playback of the Video Frame Data

The playback speed is set to n times as much speed as the standard speed (n>1, high-speed playback) (hereinafter it is described as n× speed), and the number of times of the playback is set to m. Only I picture is extracted in the extraction of the video frame data. Since one GOP includes 15 frames, n and m are decided so that the extraction rate 1/(n×m) of the video frame data may become 1/15. In the video signal, one frame, i.e., I picture, is extracted from one GOP (15 frames). This I picture is played back m times. In this case, as mentioned above, the medium control unit 113 reads the video data from the recording medium 114 in accordance with the playback speed. The video extraction unit 122*a* extracts each one I picture from each one GOP (15 frames) of the video signal. The video decoder 123a plays back each I picture 5 times at the time of 3× speed, plays back each I picture 3 times at the time of 5× speed, and plays back each I picture once at the time of 15× speed. Only I picture is extracted and is played back repeatedly, so that a simple and assured playback processing at a high-speed is attained and visibility of the played back video is improved.

(2) Extraction and Playback of the Audio Frame Data

The method of extraction of the audio frame data differs from the method of extraction of the video frame data. Since the voice data is easy to decode compared with the video data, even if the audio frame other than the audio frame corresponding to the video frame to play back is used, a high-speed audio playback processing is carried out certainly and easily. Further, a repetition playback is not carried out, so that the played back sound is easy to listen.

The playback speed is set to n× speed (n>1, high-speed playback), and the number of times of the playback is set to m. Since the audio is not played back repeatedly unlike the video, the number of times of the playback is 1 time (m=1). At n× speed (n>1), one frame data is extracted from the (n×m) frames of the audio signal at an extraction rate of 1/(n×m). The extracted audio frame data is decoded and played back. For example, the audio extraction unit 122b extracts one audio frame data from every three frames at the time of 3× speed, extracts one audio frame data from every five frames at the time of 5× speed, and extracts one audio frame data from every 15 frames at the time of 15× speed (hereinafter, it is called an extraction condition 1). In the case of 3× speed and 5× speed, the amount of information included in the audio to be played back can be increased by increasing the audio frame to be used more than the video frame. Uncomfortable feeling to the sound played back can be reduced by not playing back repeatedly.

The method of extraction of the audio frame is not restricted to the above-mentioned example. Seven frame data may be extracted from 21 frames at the time of 3× speed, four frame data may be extracted from 20 frames at the time of 5× speed, and one frame data may be extracted from 15 frames at the time of 15× speed (hereinafter, it is called an extraction condition 2). In this case, in 3× speed and 5× speed, the sound easy to recognize is reproduced by extracting continuous frames.

The extraction condition of the audio frame is fixable to either one of the extraction condition 1 or the extraction condition 2. Furthermore, the extraction condition may be changed to the extraction condition 1 or the extraction condition 2 from another by the input inputted to the operation input unit 133.

In addition, in the both of the video and the audio, all the frames are extracted and played back at the 1× speed (the standard speed).

(Operation of the Video and Audio Recording and Playback Apparatus 10)

Hereinafter, the operating procedure of the video and audio recording and playback apparatus 10 is explained. FIG. 3 is a flow chart showing an example of the operating procedure of the video and audio recording and playback apparatus 10.

(1) Setup of the Playback Speed (Step S11)

The playback speed (n=1, 3, 5, 15) is chosen by the operation input unit 133, and the operation input unit 133 receives the selected playback speed. The extraction condition of the audio frame data is also chosen and the operation input unit 133 receives it.

(2) Determination of the Extraction Rate of the Data and the Number of Times of the Playback (Step S12)

The extraction rate and the number of times of the playback of the data are determined based on the playback speed. The main control unit 131 determines the extraction rate and the number of times of the playback of the data with reference to the extraction and playback condition table T.

(3) Extraction of the Video Data and the Audio Data (Step S13)

The video data and the audio data are extracted based on the extraction rates which were determined. The video extraction unit 122a extracts the video frame data corresponding to the playback speed from the video signal, and the audio extraction unit 122b extracts the audio frame data corresponding to the playback speed from the audio signal.

(4) Playback of the Video Data and the Audio Data (Step S14)

The video data and the audio data are played back. The video decoding unit 123a decodes the extracted video frame data and outputs decoded video data as the video signal. The audio decoding unit 123b decodes the extracted audio frame data and outputs the decoded audio data as the audio signal. At this time, the video decoding unit 123a decodes the extracted video frame data the determined number of times continuously repeatedly based on the determined number of the times of playback. On the other hand, the audio decoding unit 123b decodes the audio frame data once. As a result, the video frame data and the audio frame data of 1/n of the original frame number are played back, and thereby the video and the audio are played back at n× speed.

According to the embodiment, the video and audio playback apparatus and the video and audio playback method which generate the video and the audio in accordance with the each characteristic at the time of the high-speed playback can be provided.

In the above-mentioned embodiment, the video decoder 123a plays back the frame which the video extraction unit 122a outputs, repeatedly multiple times. Instead of this, the video extraction unit 122a may output the same frame repeatedly multiple times and the video decoder 123a may play back the video data which the video extraction unit 122a outputs.

Figure 4:
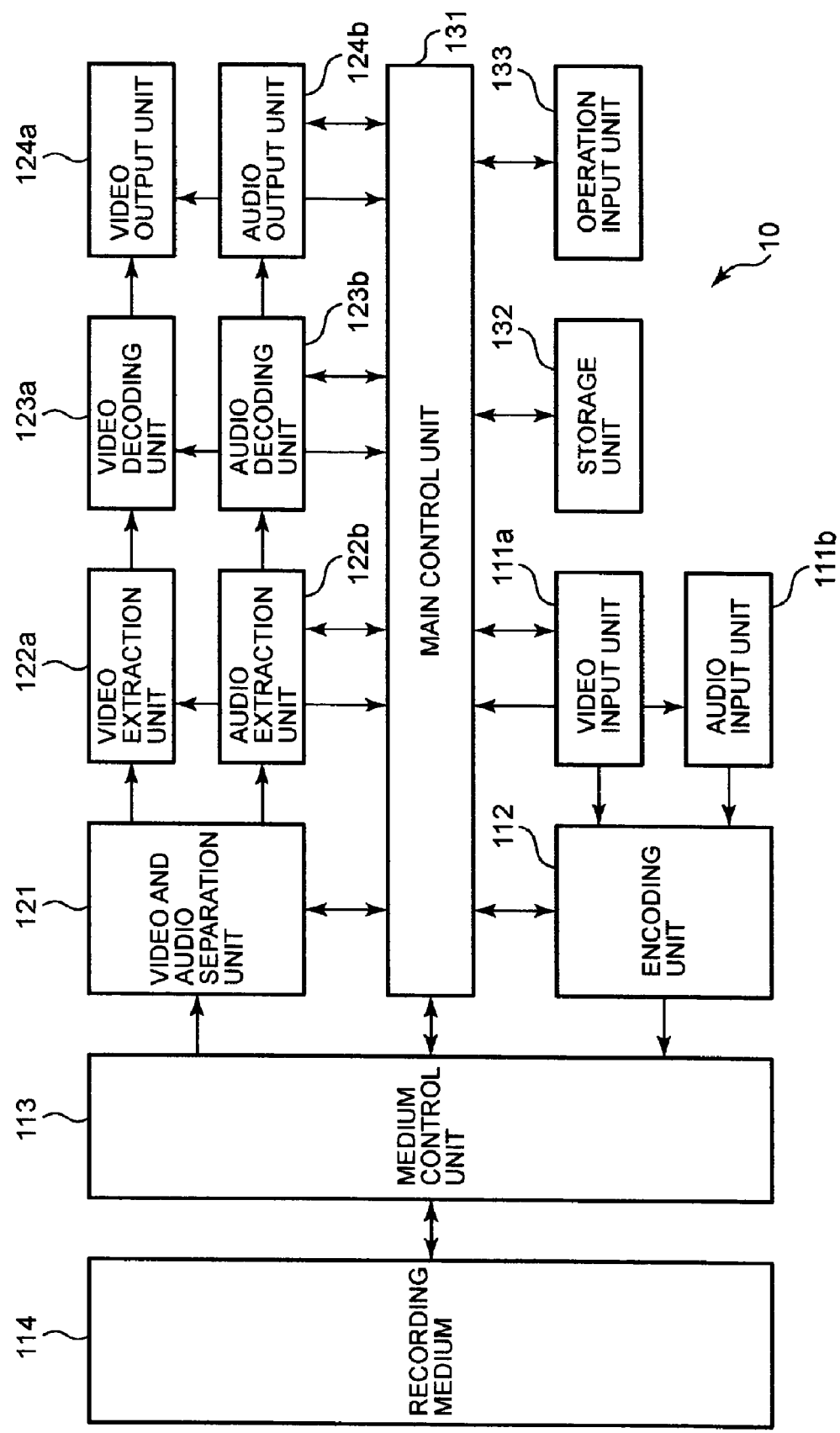
FIG. 4 is a block diagram showing a video and audio recording and playback apparatus 10 according to a modification of the first embodiment.

In the above-mentioned embodiment, the medium control unit 113 read out the video data and the audio data from the recording medium 114, the video extraction unit 122a extracts the predetermined video data from the video data, and the audio extraction unit 122b extracts the predetermined audio data from the audio data. However, a video and audio separation unit 121 which separates the video and audio data read out into the video data and the audio data may be installed as shown in FIG. 4, depending on the data format of the video and audio data recorded on the recording medium 114.

The above-mentioned embodiment uses the audio signal which was encoded and compressed. On the other hand, it is also possible to use an uncompressed audio signal. For example, in predetermined frame numbers (5 frames, for example), if the audio signal synchronizes with the video signal, the audio signal can be applied to the invention regardless of the existence of the compression of the audio signal. For example, a combination of an encoded and compressed video signal and an uncompressed audio signal can be used.

In the above embodiment, the video and audio recording and playback apparatus which includes the video input unit 111a, the audio input unit 111b and the encoding unit 112 is explained. However, the video and audio playback apparatus of the present invention may be an apparatus without the video input unit 111a, the audio input unit 111b and the encoding unit 112 only for playback.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A video and audio playback apparatus for reading out a video and audio data including an I picture of MPEG which is a first video data encoded by an intra-frame encoding, a P picture or B picture of MPEG which is a second video data encoded by an inter-frame prediction encoding, and an audio data corresponding to a video frame of the first video data or the second video data from a recoding medium and for playing back the video and audio data, the apparatus comprising:

an input unit configured to receive a playback speed of n times of a standard speed;
a deciding unit to determine a first rate at which the first video data is extracted from the video and audio data, a second rate at which the audio data is extracted from the video and audio data, and the number of times which the first video data extracted is played back, in accordance with the playback speed received by the input unit;
a first extraction unit configured to extract the first video data from the video and audio data at the first rate decided by the deciding unit;
a second extraction unit configured to extract the audio data from the video and audio data at the second rate decided by the deciding unit;
a video playback unit configured to playback the first video data extracted by the first extraction unit the number of times determined by the deciding unit; and
an audio playback unit configured to playback once the audio data extracted by the second extraction unit; wherein
the deciding unit decides to extract one I picture per one group of pictures (GOP) (a number of frames is n1) from the video and audio data, play back the I picture n1/n times, and extract the audio data of continuous frame with a rate of one frame per n1 frames from the video and audio data.

2. The video and audio playback apparatus according to claim 1, wherein the first extraction unit outputs the first video data extracted, and the video playback unit repeatedly the number of times determined by the deciding unit plays back the first video data outputted from the first extraction unit.

3. The video and audio playback apparatus according to claim 1, wherein the first extraction unit repeatedly the number of times determined by the deciding unit outputs the first video data extracted, and the video playback unit plays back the first video data outputted repeatedly from the extraction unit.

4. The video and audio playback apparatus according to claim 1, wherein the deciding unit decides the first rate is 1/15 for a GOP of 15 frames, decides the number of times with which the first video data is played back is 5, 3 and 1 and the second rate is 7/21 or 1/3, 4/20 or 1/5, and 1/15 for playback speeds of 3×, 5× and 15×, respectively.

* * * * *